United States Patent
Wentworth et al.

(10) Patent No.: US 10,161,201 B2
(45) Date of Patent: Dec. 25, 2018

(54) POWERED SLIP ACTUATION

(71) Applicant: Earth Tool Company LLC, Lake Mills, WI (US)

(72) Inventors: Steven W. Wentworth, Scottsdale, AZ (US); Robert F. Crane, Nekoosa, WI (US); Mark D. Randa, Summit, WI (US)

(73) Assignee: Earth Tool Company LLC, Lake Mills, WI (US)

( * ) Notice: Subject to any disclaimer, the term of this patent is extended or adjusted under 35 U.S.C. 154(b) by 0 days.

(21) Appl. No.: 15/585,295

(22) Filed: May 3, 2017

(65) Prior Publication Data

US 2017/0234084 A1 Aug. 17, 2017

Related U.S. Application Data

(63) Continuation of application No. 15/010,866, filed on Jan. 29, 2016, now abandoned, which is a
(Continued)

(51) Int. Cl.
*E21B 19/08* (2006.01)
*E21B 19/10* (2006.01)
(Continued)

(52) U.S. Cl.
CPC .............. *E21B 19/10* (2013.01); *E21B 7/046* (2013.01); *E21B 7/20* (2013.01); *E21B 19/07* (2013.01);
(Continued)

(58) Field of Classification Search
USPC ............ 405/154.1, 174, 184.1, 184.3, 184.4; 254/29 R
See application file for complete search history.

(56) References Cited

U.S. PATENT DOCUMENTS

| | | | |
|---|---|---|---|
| 4,589,802 A | 5/1986 | Hampton | |
| 5,785,458 A * | 7/1998 | Handford | E21B 7/30 175/62 |

(Continued)

OTHER PUBLICATIONS

United States Patent and Trademark Office, "Office Action Summary", dated May 28, 2015, U.S. Appl. No. 14/242,546, 17 pages, Alexandria, VA.
United States Patent and Trademark Office, "Office Action Summary", dated Sep. 4, 2015, U.S. Appl. No. 14/242,546, 13 pages, Alexandria, VA.
United States Patent and Trademark Office, "Advisory Action Before the Filing of an Appeal Brief", dated Nov. 13, 2015, U.S. Appl. No. 14/242,546, 3 pages, Alexandria, VA.
(Continued)

*Primary Examiner* — Sean D Andrish
(74) *Attorney, Agent, or Firm* — Tomlinson McKinstry, P.C.

(57) ABSTRACT

A method for pushing and pulling rod strings through the ground or an underground pipe. A grip assembly is supported on a stationary frame and moveable relative to the stationary frame. The grip assembly has a slip bowl tapering from a large opening to a small opening in a first direction, a plurality of slips, and an actuator. The actuator powers relative axial movement between the slip bowl and the slips. A positioning assembly carries the grip assembly and powers its reciprocating and straight-line movement to urge the grip assembly in either a first or second direction. The grip assembly will work when operated to push or pull the pipe, irrespective of the is direction of the slips.

18 Claims, 10 Drawing Sheets

Related U.S. Application Data continuation-in-part of application No. 14/242,546, filed on Apr. 1, 2014, now abandoned.

(60) Provisional application No. 61/807,004, filed on Apr. 1, 2013.

(51) Int. Cl.
| | | |
|---|---|---|
| *E21B 7/20* | (2006.01) | |
| *E21B 19/086* | (2006.01) | |
| *F16L 55/165* | (2006.01) | |
| *E21B 7/04* | (2006.01) | |
| *E21B 19/07* | (2006.01) | |
| *E21B 19/083* | (2006.01) | |

(52) U.S. Cl.
CPC .......... *E21B 19/083* (2013.01); *E21B 19/086* (2013.01); *F16L 55/1658* (2013.01)

(56) References Cited

U.S. PATENT DOCUMENTS

| | | |
|---|---|---|
| 6,220,807 B1 | 4/2001 | Sorokan |
| 6,568,488 B2 | 5/2003 | Wentworth et al. |
| 7,891,469 B1 | 2/2011 | Sipos |
| 8,863,846 B2 | 10/2014 | Overstreet |
| 2007/0071558 A1 | 3/2007 | Wentworth et al. |
| 2014/0270970 A1 | 9/2014 | Aus |

OTHER PUBLICATIONS

United States Patent and Trademark Office, "Office Action Summary", dated Jun. 20, 2016, U.S. Appl. No. 15/010,866, 12 pages, Alexandria, VA.

United States Patent and Trademark Office, "Office Action Summary", dated Dec. 6, 2016, U.S. Appl. No. 15/010,866, 12 pages, Alexandria, VA.

\* cited by examiner

POWERED SLIP ACTUATION

CROSS REFERENCE TO RELATED APPLICATION

This application is a continuation of U.S. application Ser. No. 15/010,866 filed Jan. 29, 2016, which is a continuation-in-part of U.S. application Ser. No. 14/242,546, filed Apr. 1, 2014, which claims the benefit of U.S. Provisional Patent Application Ser. No. 61/807,004, filed on Apr. 1, 2013, the entire contents of which are incorporated herein by reference.

BACKGROUND

As the infrastructure of underground utilities has aged the need to replace these underground utilities has grown. However, home and business owners do not like to have their landscaping and streets dug up during, the replacement of underground utilities. Thus, systems and methods for the replacement of underground utilities with minimal surface disruption have been developed. For example, horizontal directional drills are regularly used to install new and replace old utilities. Another technology widely used is a pit launched rod string pushing and pulling machine. These machines push a rod string, comprised of a series of rod string sections attached end-to-end, through the existing, pipeline from the launch pit to an exit point remote from the machine. The rod string sections may comprise solid rods, tubular members, or partially hollowed out sections of rod string. Rod string sections are added to the rod string as the rod string is pushed into the existing utility pipe.

One skilled in the art will appreciate that a downhole tool comprising a drill bit could be attached to the far end of the rod string to allow the rod string, to cut through the ground or an existing pipe. Once the far end of the rod string reaches the target location a different downhole tool may be attached to the far end of the rod string and used to burst the old utility pipe and guide the new replacement product pipe into the hole. The new product pipe to be installed may be connected to the downhole tool so that the new pipe follows the downhole tool back through the ground or old pipe to the launch pit. The machine grips the rod string and, using hydraulic cylinders, pulls the rod string, downhole tool, and new pipe toward the launch pit. The downhole tool may comprise a pipe bursting head configured to either burst or slice the old pipe and push it into the surrounding soil.

Oil rigs use gravity assisted slips to hold the drill string off the bottom of the bore, such as when tripping out to change the drilling tooling, or to provide torsional restraint when adding or removing the top from the string. Gravity assisted slips have a heavy walled outer slip bowl, slips, and jaws. The slip bowl is generally mounted on a structure that passes reaction forces to the ground. The slip bowl is ring shaped and has a conical inside surface running for its functional length; both ends of the bowl are open.

The drill pipe is disposed at cylindrical centerline of the slip bowl. The angle of the conical side relative to the centerline is on the order of five (5) to fifteen (15) degrees with a preferred angle of ten (10) degrees per side. Without the slips engaged with the rod string, the rod string is free to move in either direction along the axial centerline. Slips are generally thin walled segments having a conical surface on a first side and a cylindrical surface on a second side. The conical surface of the slip is configured to slide with low friction against the conical inner surface of the slip bowl. The cylindrical inner surface of the slip is intended to produce a high coefficient of friction against the matching cylindrical surface of the rod and may have a hardened and serrated finish intended to bite into the mating rod surface. The inner surface is the jaw and may be a replaceable component within the slip. There is generally a minimum of two slips and often there are more, up to a dozen.

Gravity causes the slips to drop into the tapered annular space between slip bowl and the rod. This causes friction between the rod and the slips. As the rod string moves down under the force of gravity the slip moves with it deeper toward the small diameter end of the slip bowl. Movement continues until at least two opposing slips apply normal forces to the slip bowl cone and the rod string. At this point the rod will be centered in the bowl and both the normal forces and the friction forces of the components rise quickly with slight distances of rod string travel.

The rod string and slips move deeper into the slip bowl until the friction forces on the rod string are equal in magnitude and opposite in direction to the weight (or other) forces pulling the rod string and causing movement. The rod will stop when the normal force around the bowl has caused the bowl to grow slightly within its elastic nature allowed by the geometry of all the components involved adjacent to and including, the slip bowl. The present invention provides a system to induce slip movement toward the small end of the slip bowl without requiring the force of gravity. Such a system clamps the rod string in either the vertical or horizontal orientation. The system of the present invention also allows the rod string to be clamped when it is being pushed in a direction that would typically cause the slips and jaws to release their grip. Additionally, the system allows the rod string to be clamped for resisting torsional loads when no tensile or compressive load exists on the rod string to cause the jaws to grip the is rod string. The powered gripping system of the present invention also provides a residual force on the rod string in the event the rod string is suddenly unloaded. The powered grip maintains the clamp load on the rod string and will cause the mass of the machine to absorb at least some of the stored energy to reduce the likelihood of the rod string traveling backwards through the machine unimpeded.

FIELD

The present invention relates generally to machines for pushing and pulling rod strings through the ground and specifically to machines used to replace underground pipe and utilities.

SUMMARY

The present invention is directed to a system comprising a grip assembly and a positioning assembly. The grip assembly comprises a slip bowl having a tapering internal passage, a plurality of slips, and an actuator. Each slip has an external surface conformable with the internal passage of the slip bowl. The actuator does not engage the internal surface of any slip and powers relative axial movement between the slip bowl and the slips. The positioning assembly carries the grip assembly and powers its reciprocating and straight-line movement.

The present invention is likewise directed to a method of using the system described herein to position a portion of a rod string section within the slip bowl, powering the actuator to urge the slips in a first direction within the slip bowl toward a narrow end of the slip bowl and into a gripping relationship with the rod string section. The positioning assembly is powered to urge the grip assembly and gripped rod string section in the first direction.

The present invention is directed to a method. The method comprises positioning a first portion of a rod string section within a slip bowl having an internal passage that tapers in a first direction from a larger first end to a smaller second end. thereafter, a plurality of slips, each having an external surface matching the internal passage of the slip bowl, are actuated in the first direction to cause a gripping relationship between the plurality of slips and the rod string. The slip bowl and the rod string are urged in the first direction when the plurality of slips and the rod string are in the gripping relationship to urge a second portion of the rod string into the ground. The slip bowl and rod string are urged a second direction to urge a second portion of the rod string out of the ground, wherein the first direction and second direction are opposite.

DETAILED DESCRIPTION

Figure 1:
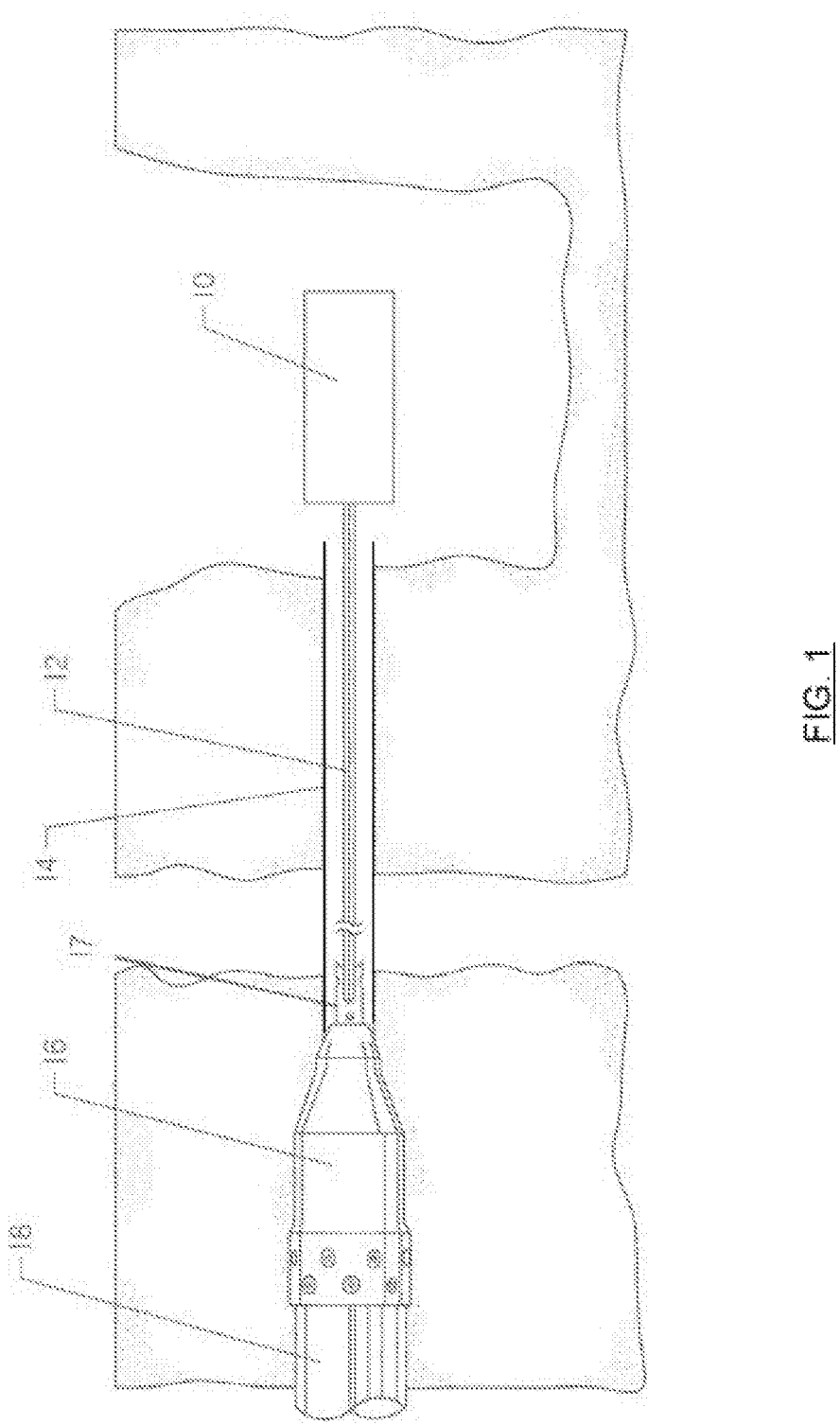
FIG. 1 is a diagrammatic representation of one possible use of the rod string grip assembly of the present invention in a utility installation operation.

Turning now to the figures, FIG. 1 shows a rod string pushing/pulling machine generally referred to herein as a thrust unit 10 intended for horizontal pipe bursting. The thrust unit 10 is connected to a rod string 12 for pushing the rod string horizontally into the ground or an existing pipe 14 and pulling back a downhole tool 16 and a new pipe 18. As show, the downhole tool 16 may comprise a pipe burster and swivel 17 for connecting the downhole tool to the new pipe 18. However, when the rod string 12 is being thrust into the borehole the downhole tool may comprises a drill bit used to cut through the ground or other debris blocking the path of the rod string to the target location. The rod string 12 may be threaded, or may be hooked together by turning or fitting rod string sections 160 (FIG. 9) together. One skilled in the art will appreciate that the process of pushing the rod string 12 into the existing pipe 14 will require thrust force.

Figure 2:
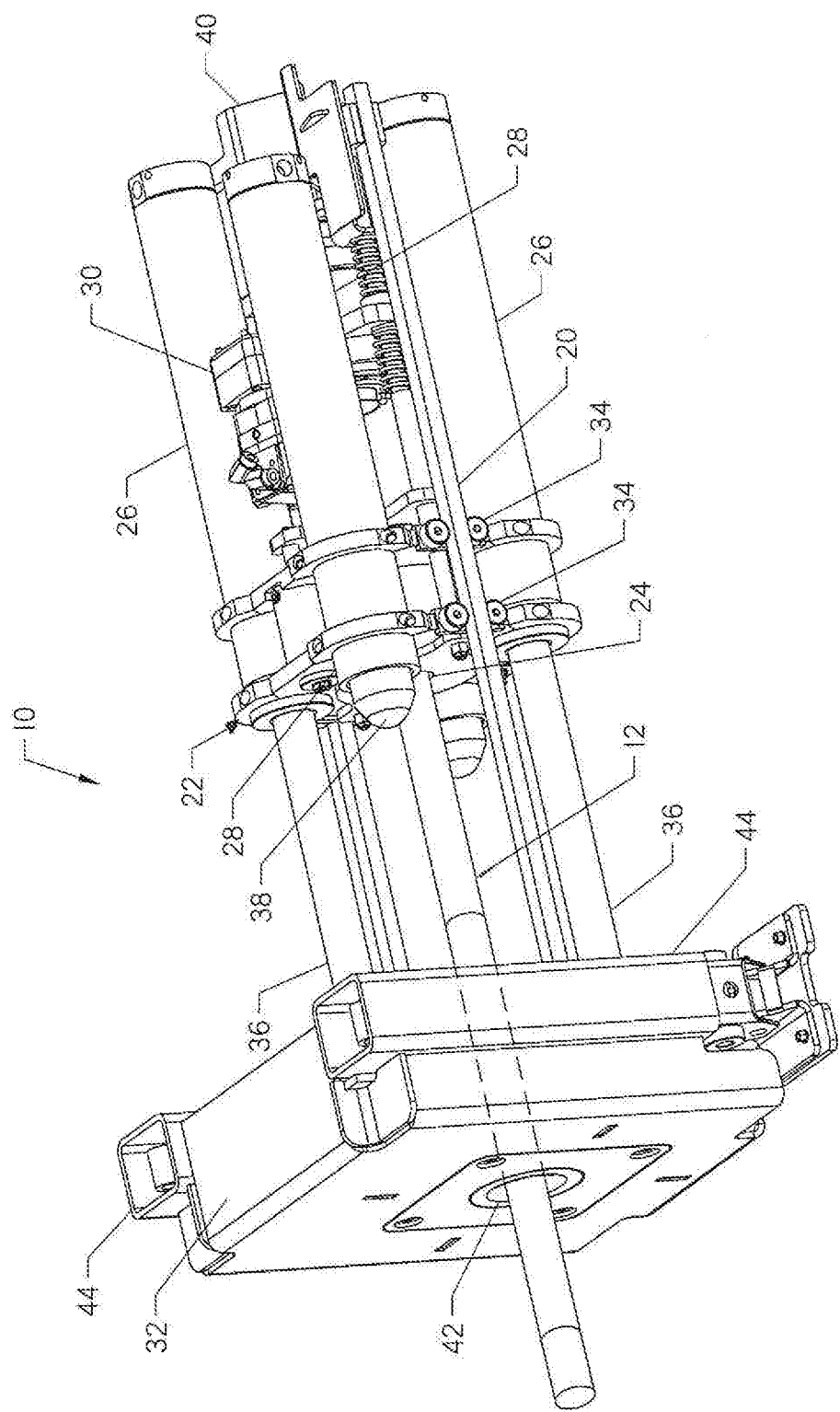
FIG. 2 is an isometric view of a rod string pushing/pulling device with the external housing and hydraulics removed.

Turning now to FIG. 2, the thrust unit 10 is shown with rod string 12. The thrust unit 10 comprises a positioning assembly 22 that carries a grip assembly 24 and powers its reciprocating and straight-line movement. The positioning assembly 22 may comprise a rail 20, cylinders 26, and rams 28. A slip bowl assembly 56 (FIG. 4) is movable along the rail 20 relative to a stationary frame 32. The slip bowl assembly 56 may support the grip assembly 24 and is connected to the cylinders 26 and engages rams 28.

The slip bowl assembly 56 comprises wheels 34 for interaction with the rail 20. One of ordinary skill will appreciate that rack-and-pinion, pulley, or other systems are appropriate for movement of the slip bowl assembly 56 relative to the stationary frame 32. Further, the thrust unit 10 may be operable with different numbers of cylinders 26 and rams 28. Two cylinders 26 and rams 28 are chosen for convenience in the figures and are not limiting on this invention. An appropriate thrust unit and positioning assembly for use with the present invention is disclosed in co-pending and co-owned U.S. Patent Application Ser. No. 14/206,548, filed Mar. 12, 2014, the contents of which are incorporated fully herein.

The grip assembly 24 reciprocates in a straight-line toward and away from the stationary frame 32 along the rails 20. The cylinders 26 are connected on a first end to the slip bowl assembly 56 and on a second end to the stationary frame 32. Each cylinder 26 comprises a cylinder rod 36. The cylinder rods 36 are movable between a retracted and extended position in response to flow of hydraulic fluid to and from the cylinders 26. As shown, cylinder rods 36 of tine cylinders 26 are in the extended position. The cylinders 26 expand and retract to increase or decrease the distance between the stationary frame 32 and the slip bowl assembly 56, causing the rod string 12 to either push into tine ground or be pulled out of the ground. As shown, the cylinders 26 are diagonally disposed about the slip bowl assembly 56 and therefore the rod string 12.

With continued reference to FIG. 2, the rams 28 provide additional pull back load when the pull back of cylinders 26 alone is insufficient. The rams 28 comprise a contact surface or thrust nose 38 for contacting the stationary frame 32. As shown, the thrust nose 38 is a rounded nose, though a flat end or other configuration may be used. The rams 28 are hydraulically actuated and mechanically retracted cylinders moveable between a retracted and extended position in response to the flow of hydraulic fluid. The rams 28 are attached at a first end to the slip bowl assembly 56 but not attached to the stationary frame 32.

The rod spinner 30 threads on or off rod string sections 160 (FIG. 9) of the rod string 12 to make up or break out the rod string 12 during pushing or pulling operations. The rod spinner 30 may alternatively connect sections of the rod string without threading, if unthreaded sections are utilized. A support frame 40 travels with the slip bowl assembly 56 and maintains alignment between a rod string section 160 about to be added or a newly removed rod string section.

The stationary frame 32 is a reaction plate that is positioned to ground the thrust unit 10 and allow the extension of the cylinders 26 to cause the slip bowl assembly 56 to pull or push the rod string 12. The stationary frame 32 comprises a central aperture 42 and jacks 44. The rod string 12 travels through the central aperture 42 and through the grip assembly 24. Jacks 44 stabilize the stationary frame 32 to the ground such that the operation of the thrust unit 10 does not cause excessive movement in the stationary frame.

Figure 3:
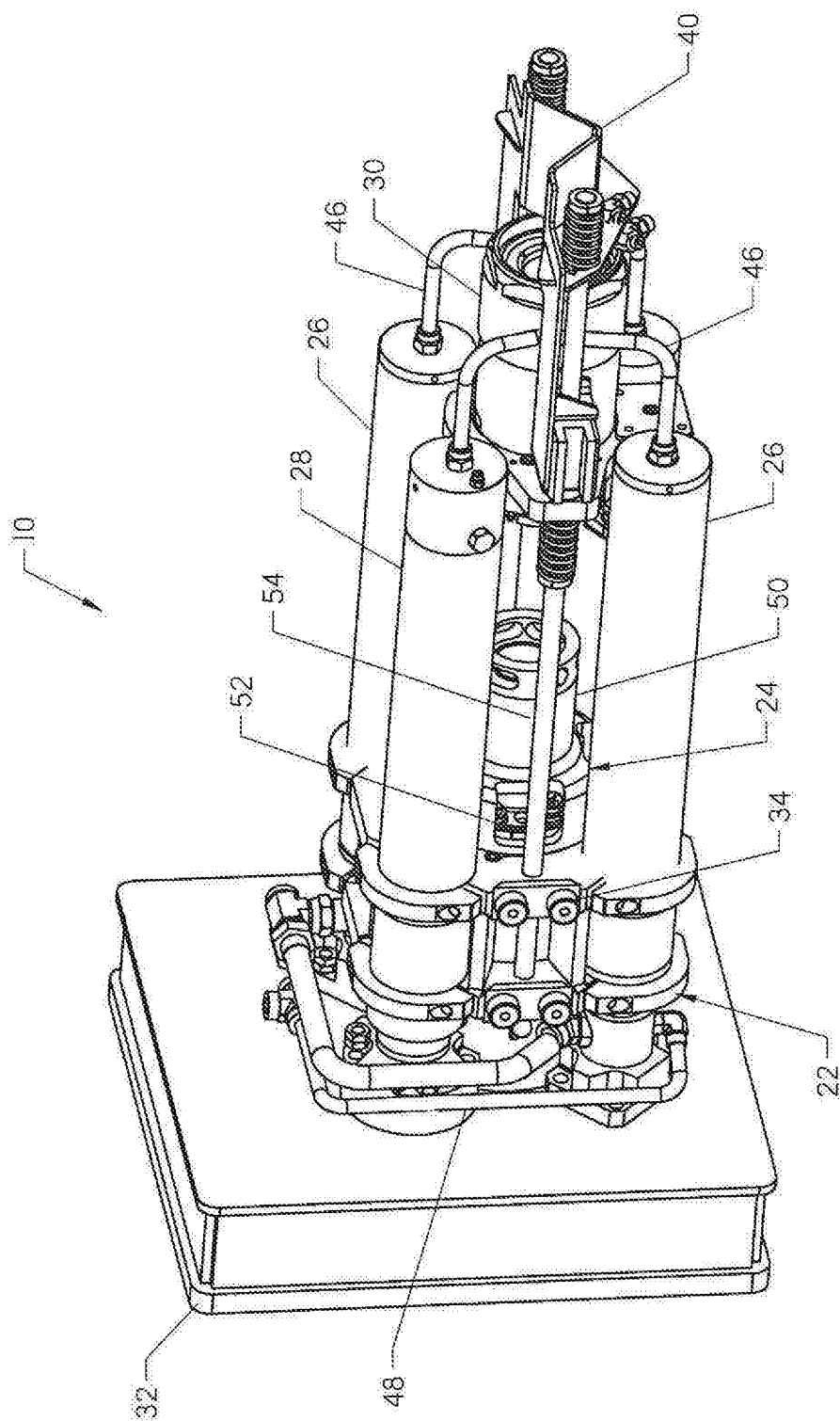
FIG. 3 is an isometric view of the rod string pushing/pulling device of FIG. 2 shown from the opposite end with several hydraulic pathways shown.

Turning now to FIG. 3, the device of FIG. 2 is shown from the opposite end. Rails 20 and jacks 44 (FIG. 2) have been removed for clarity. However, hydraulic lines 46 and 48 are shown to illustrate the hydraulic pathways used to power operation of cylinders 26 and rams 28. The cylinders 26 are shown retracted so that the slip bowl assembly 56 is disposed immediately adjacent the stationary frame 32. The grip assembly 24 is shown disposed between the cylinders 26 and rains 28. An actuator 50, thrust member 52, and rails 54 are the only visible components of the grip assembly 24. Each of these components will be discussed hereinafter.

Figure 4:
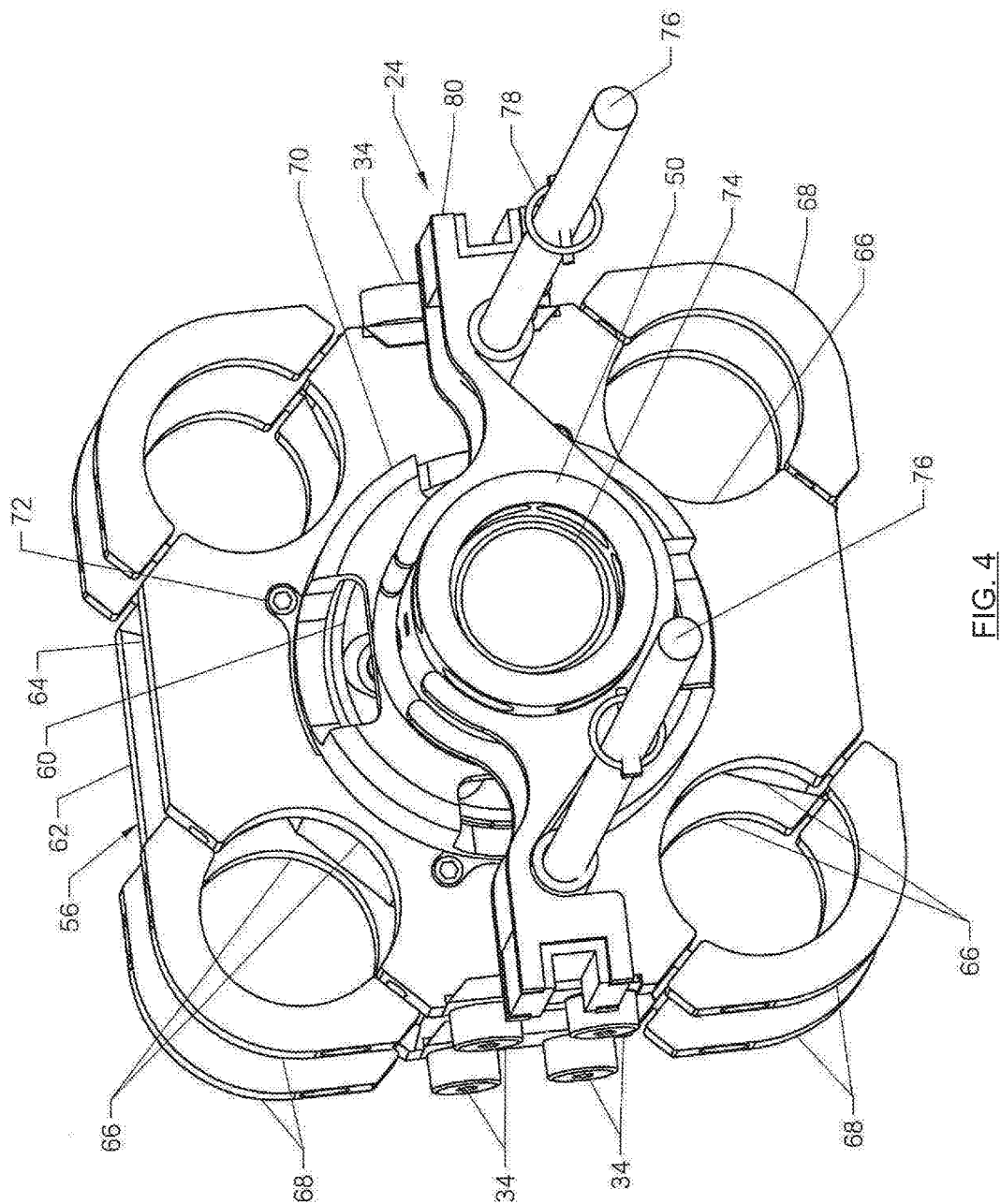
FIG. 4 is a diagrammatic illustration of a grip assembly of the device of FIGS. 2 and 3.

Turning now to FIG. 4, the grip assembly 24 is shown in detail with other components of the thrust unit 10 stripped away for clarity. The grip assembly 24 comprises a slip bowl 92, a plurality of slips 96, and the actuator 50. The grip assembly 24 may also comprise jaws 58 (FIG. 6) supported on the slips 96 and a thrust member 60 aligned with a slip bowl 92.

A slip bowl assembly 56 that comprises a front flange 62 and a rear flange 64 supports the slip bowl 92. The front flange 62 and the rear flange 64 may comprise a flat steel plate each having a set of four pockets 66 formed around the plates' periphery. The pockets 66 receive the cylinders 26 or rams 28 (FIG. and connect the cylinder and ram housings to the slip bowl assembly 56 for movement therewith. Bolt on caps 68 secure the cylinders 26 or rams 28 to the flanges 62 and 64. Wheels 34 are attached to the flanges 62 and 64 and as previously discussed ride along rails 20 (FIG. 2).

A bracket 70 is attached to the rear flange 64 to support the actuator 50 in alignment with the slip bowl 92. The bracket 70 may be fastened to the rear flange 64 with bolts 72. The actuator 50 is supported by the bracket 70 and comprises a hydraulic cylinder having an opening 74, which allows the rod string section 160 (FIG. 9) to pass through the actuator.

The grip assembly 24 may have a pair of shafts 76 to support the front flange 62, a slip bowl 92 (FIG. 6), the rear flange 64 and the actuator 50. Grenade pins 78 secure the rod support 40 (FIG. 3) to the shafts 76 for optional quick removal of the rod support. A yoke 80 is connected to the actuator 50 and is secured to the shafts 76 to fix the actuator housing on the shafts.

Figure 5:
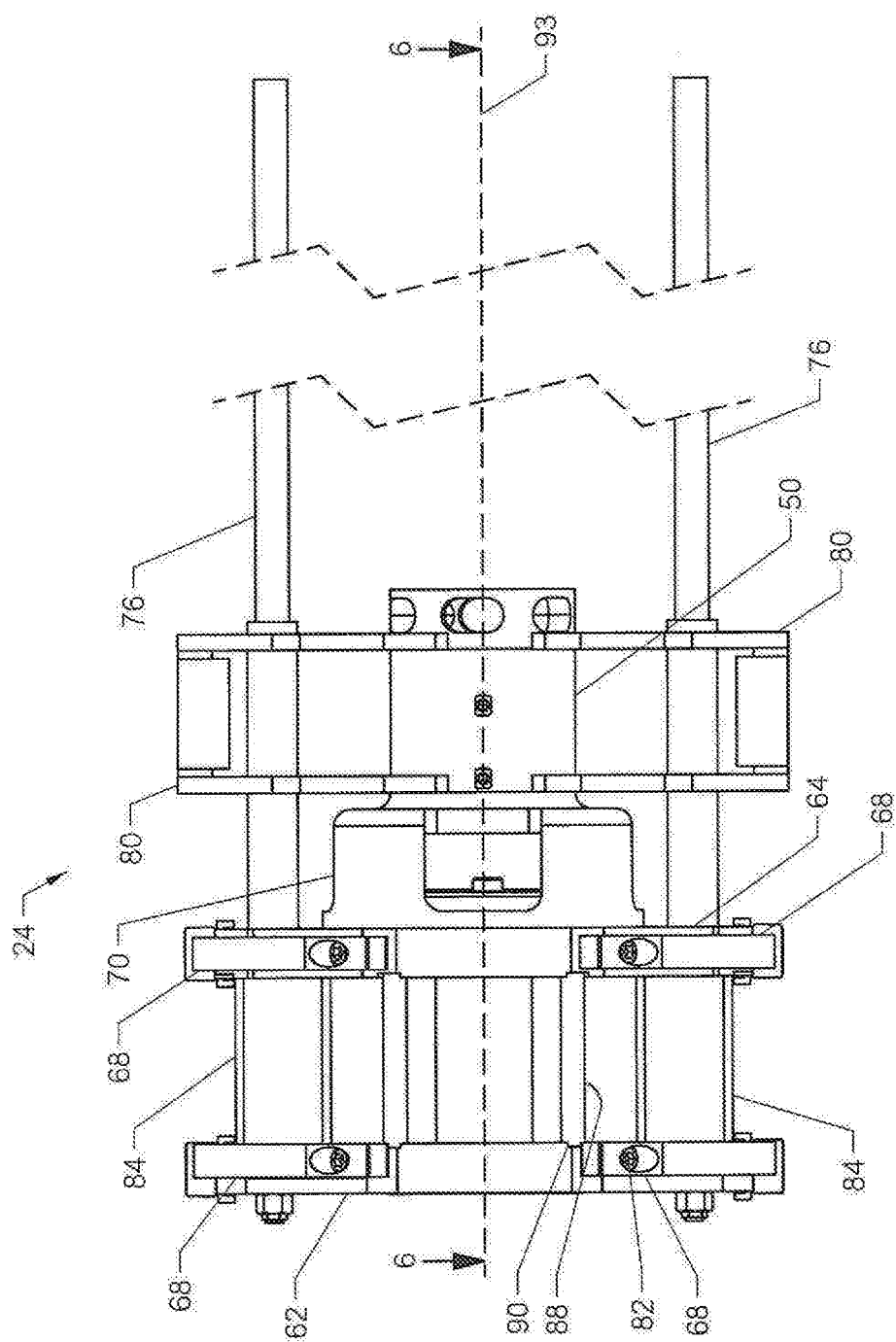
FIG. 5 is a top view of the grip assembly of FIG. 4.

Turning now to FIG. 5, the grip assembly 24 is shown from a top view. The front flange 62, rear flange 64, and yoke 80 are all shown supported on shafts 76. Although cylinders 26 and rams 28 are not shown in FIG. 5, bolt on caps 68 are shown secured to the flanges with bolts 82. Spacers 84 are disposed between the front and rear flange 62 and 64 and on the shafts 76 to provide structural support between the outer peripheries of the two flanges. A bowl ring 88 is also supported between the front flange 62 and the rear flange 64. The bowl ring 88 is supported within a pocket 90 formed in the front flange 62 and secures the slip bowl 92 (FIG. 6) between the front flange 62 and the rear flange 64.

The bracket 70 is supported on a side of the rear flange 64 opposite the bowl ring 88. The bracket 70 supports the actuator 50 in-line with the centerline axis 93 of the grip assembly 24. The slip bowl 92 is symmetric about the centerline axis 93. The positioning assembly 22 moves the grip assembly 24 such that the slip bowl 92 moves along the axis 93. The yoke 80 is connected to the actuator 50 and supports the actuator on the shafts 76.

Figure 6:
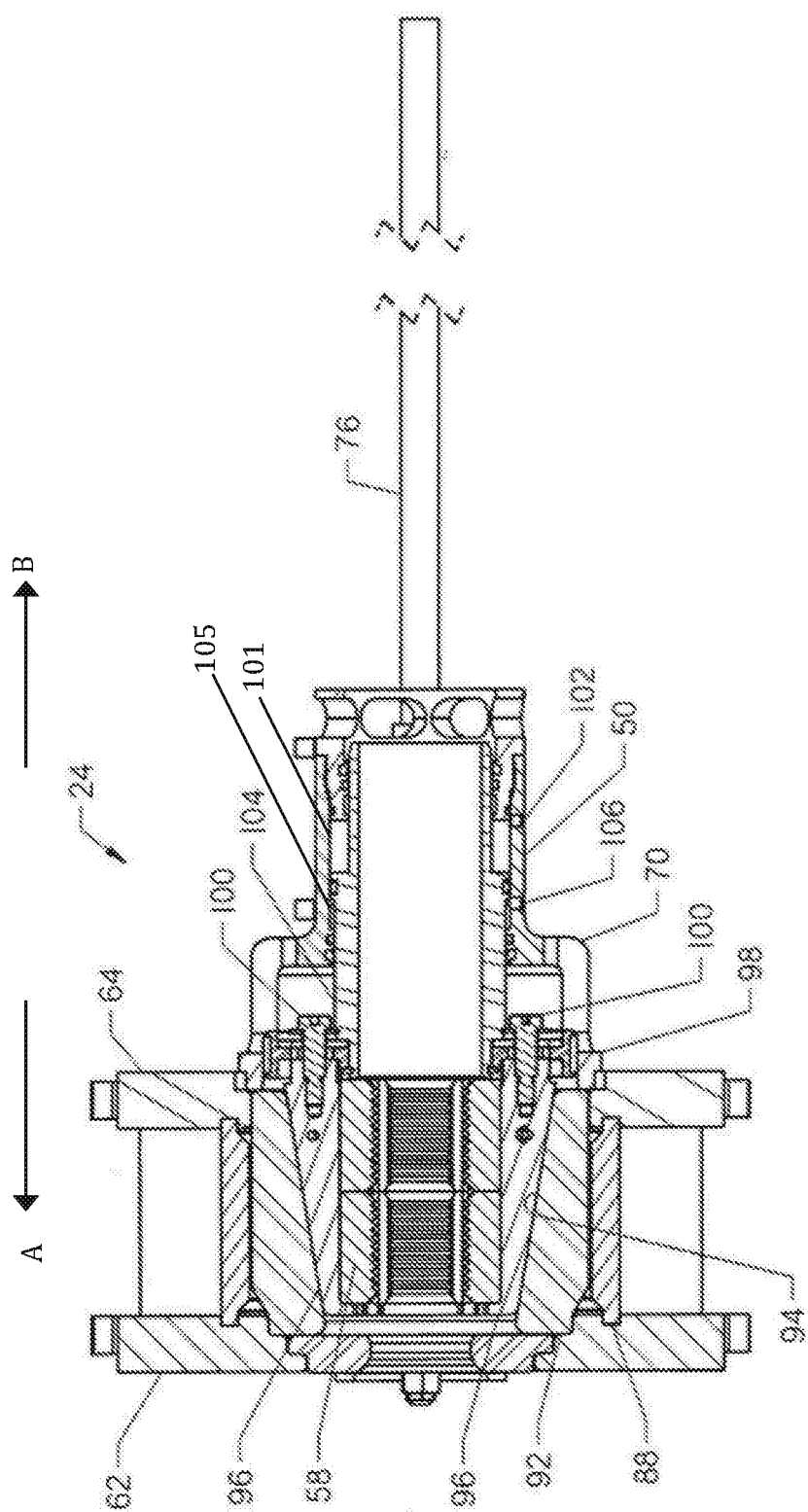
FIG. 6 is a longitudinal section view of the grip assembly of FIG. 4 taken along line 6-6.

Referring now to FIG. 6, the grip assembly 24 is shown in longitudinal section along line 6-6 as shown in FIG. 5. The grip assembly 24 comprises the slip bowl 92 the plurality of slips 96, and the actuator 50. The front flange 62, rear flange 64, and a bowl ring 88 disposed between the front flange and the rear flange support the slip bowl 92. The slip bowl 92 has a tapering internal passage 94. A wide end proximate the rear flange 64 and a narrow end proximate the front flange 62 defines the boundaries of the tapering internal passage 94.

The slips 96 each have an external surface conformable with the slope of the internal passage 94 of the slip bowl 92. The outer surface of the slips 96 may be angled to cause the slips to move toward each other as they are urged toward the narrow end of the slip bowl along the internal passage 94. As previously discussed, the angle of slips is between 5 and 15 degrees and preferably 10 degrees. The slips 96 may be connected to a thrust member 98 using fasteners 100. Alternatively, the slips 96 may be integrally formed with thrust member 98. The thrust member 98 is aligned with the opening 94 of the slip bowl 92.

Figure 9:
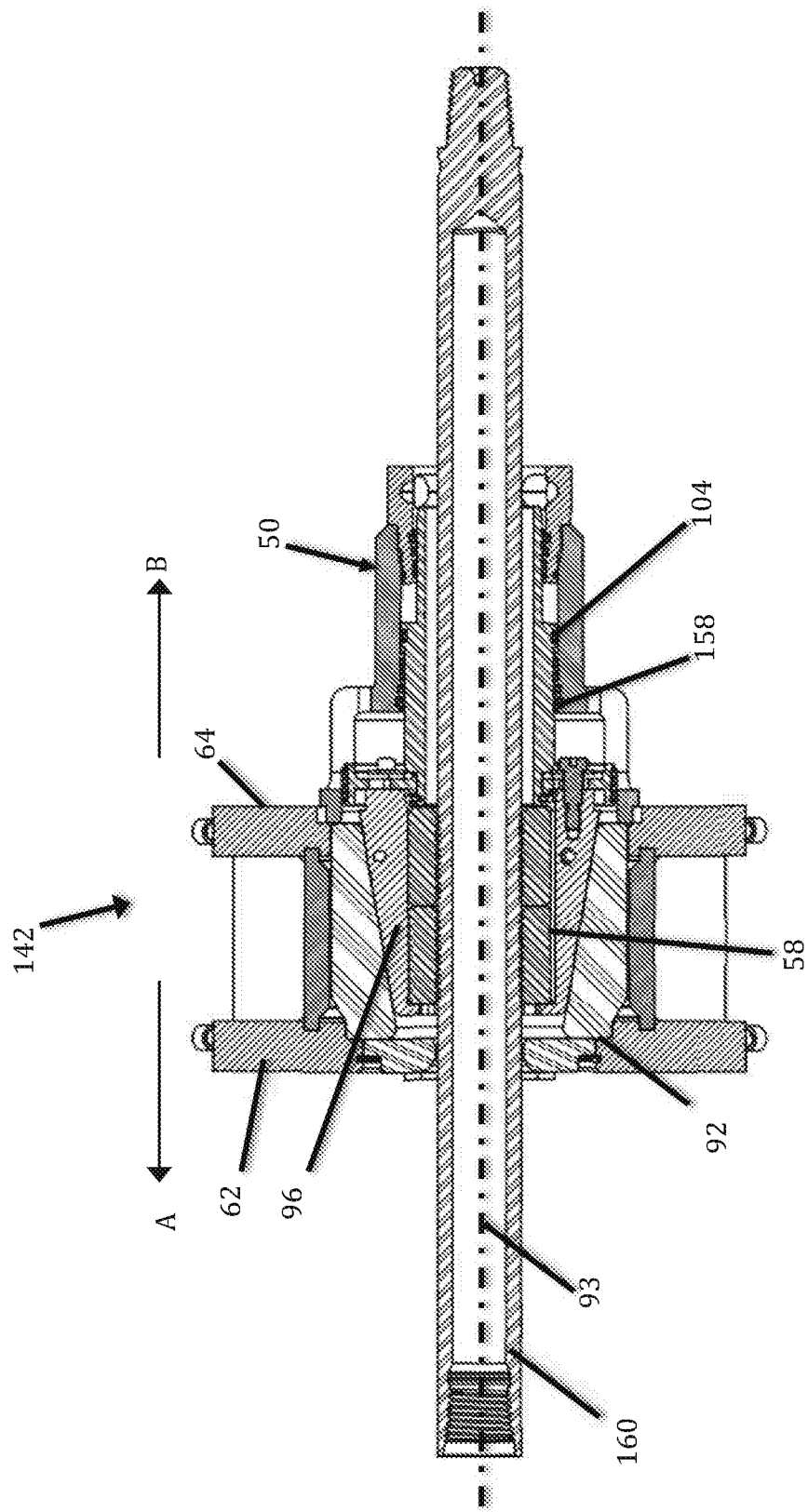
FIG. 9 is a sectional view of the gripping assembly of FIG. 8 showing the slips in a gripping relationship with the rod string section.

The slips 96 each support a jaw 58 that is disposed within the slip bowl 92 and configured to engage a portion of a rod string section disposed within the slip bowl. Thus, each jaw 58 has a partially curved inner profile conforming to the cylindrical outer profile of the rod string section 160 (FIG. 9). The jaws 58 may comprise a hardened and serrated insert used to bite into the rod string section surface. The jaws 58 may be a replaceable component within each slip 96. Of course, one skilled in the art will appreciate the slips and jaws may be integral formed.

The actuator 50 is a dual-action device that urges the slips 96 in a first direction "A" (FIG. 6) within the slip bowl 92 toward the narrow end of the slip bowl and into a gripping relationship with the rod string section 160. As shown, the "first direction" means toward the narrow end of the slip bowl 92 and toward the existing pipe 14 positioned within a borehole (FIG. 1). The actuator 50 does not engage the internal surface of any slip 96 and powers relative axial movement between the slip bowl 92 and the slips. In operation, the actuator 50 urges the thrust member 98, slips 96, and the jaws 58 in the first direction "A" relative to the slip bowl 92 toward the narrow end of the slip bowl 92 to grip the rod string section 160. Once the rod string section 160 is gripped, the positioning assembly 22 may be powered to urge the grip assembly 24 and the gripped rod string section 160 (See FIG. 9) in the first direction "A" to thrust the rod string 12 into the existing pipe 14 while the slips 96 are in the gripping relationship with the rod string section.

Actuator 50 may also be powered in a second direction "B", opposite the first direction, away from the narrow end of the slip bowl 92 and into an ungripped relationship with the rod string section 160. With the slips 96 in an ungripped relationship with the rod string section 160 the positioning assembly 22 may be powered to move the grip assembly 24 in the second direction "B" (FIG. 6) without the formerly gripped rod string section. When the positioning assembly 22 has moved the grip assembly to the desired location, the actuator 50 may be powered again to urge the slips 96 toward the narrow end of the slip bowl 92 to grip the rod string section again, or a newly added rod string section, for another thrust stroke of the positioning assembly 22.

The actuator 50 may comprise a hydraulic cylinder, a pneumatic cylinder or an electric motor used to push and pull the slips 96. The actuator 50 shown in FIG. 6 is a hydraulic cylinder comprising a hollow piston 104 that is coaxial with the axis 93 about which the slip bowl 92 symmetric. In operation, pressurized fluid enters chamber 101 of actuator 50 through port 102. The increase in fluid pressure in chamber 101 pushes the piston 104 in direction A. This action urges the slips 96 toward the narrow end of the slip bowl 92. To move the piston 104 in the second direction, is pressurized fluid enters chamber 105 through port 106 and the fluid pressure in chamber 101 is reduced to allow the fluid entering chamber 105 to push the piston 104 in the second direction "B". Moving the piston in the second direction partially withdraws the slips 96 from the slip bowl 92 and the grip on the rod string section is released.

Figure 7:
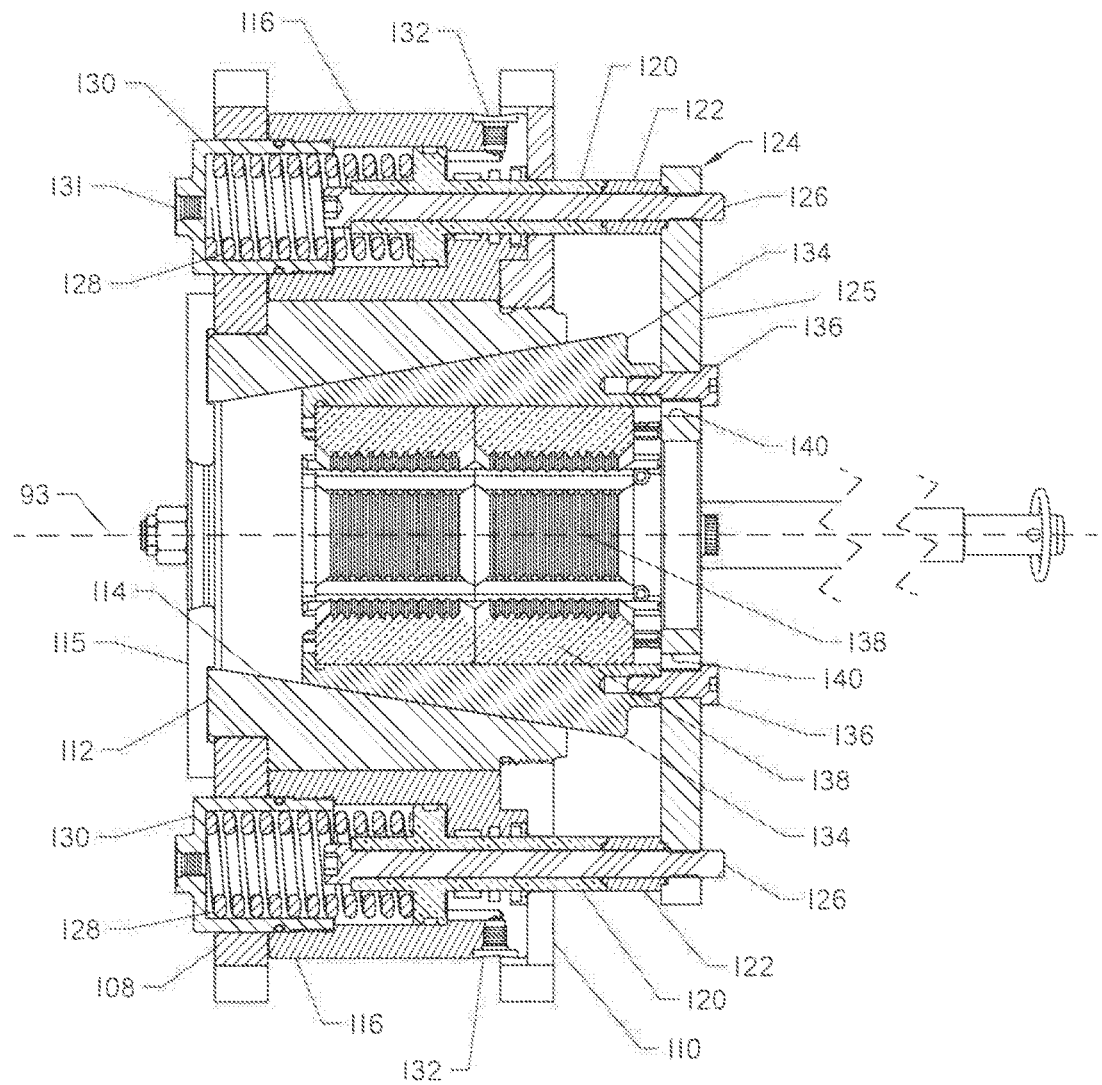
FIG. 7 is a sectional view of an alternative grip assembly.

Turning now to FIG. 7, an alternative embodiment of the grip assembly of the present invention is shown. The embodiment of FIG. 7 comprises a front flange 108 and a rear flange 110. The flanges 108 and 110 are plates having a plurality of holes formed therein for supporting different structures of the assembly. The flanges 108 and 110 are also connected to the cylinders 26 (FIG. 2) to facilitate movement of the entire assembly along rails 20 (FIG. 2). A bowl 112 is positioned between flanges 108 and 110 and secured with a threaded joint or concentric projection. The bowl 112 has a conical inner surface 114 having a lesser diameter proximate the front flange 108 and a greater diameter proximate the rear flange 110. A centering flange 115 guides the rod string through bowl 112 when jaws 138 are clamped. Centering flange 115 helps maintain the alignment of the rod string with the central axis 93 of the assembly.

Actuators 116 are secured between flanges 108 and 110 with a rod 120 of each actuator extending through a hole in flanges 108 and 110. A spacer 122 facilitates the assembly of actuators 116 into the flanges 108 and 110 and mounts to the thrust member 124 via fasteners 126. In the embodiment of FIG. 7, the thrust member 124 comprises a yoke 125. Compression springs 128 are disposed within a spring cup 180 and function to extend rods 120 and therefore yoke 125 out and away from bowl 112 when no hydraulic fluid is present on the rod side of actuators 116. When pressurized fluid enters actuators 116 through ports 132, the springs 128 are compressed and yoke 125 moves closer to bowl 112. As yoke 125 moves, so too do slips 134. The spring cups 130 comprise air vent ports 131 to allow air to escape from the chamber containing the springs 128 when the rods 120 are moved to the left in FIG. 7.

Slips 134 are bolted in the tension/compression directions to the yoke 125 by fasteners 136. Jaws 138 may be affixed to the slips 134. Jaws 138 are susceptible to wear and are therefore easily replaced. Slips 134, jaws 138 and fastener 136 make up an assembly that moves as a unit. While fastener 136 extends through yoke 125, the shouldering configuration causes the slips 134 to be loose in the obround holes 140 through which the fasteners 136 extend.

The conical inner profile 114 of the bowl 112 causes a reduction in the distance between jaws 138 when slips 134 are thrust deeper into bowl 112. This reduction in distance causes jaws 138 to squeeze down and clamp on the rod string (FIG. 1).

Figure 8:
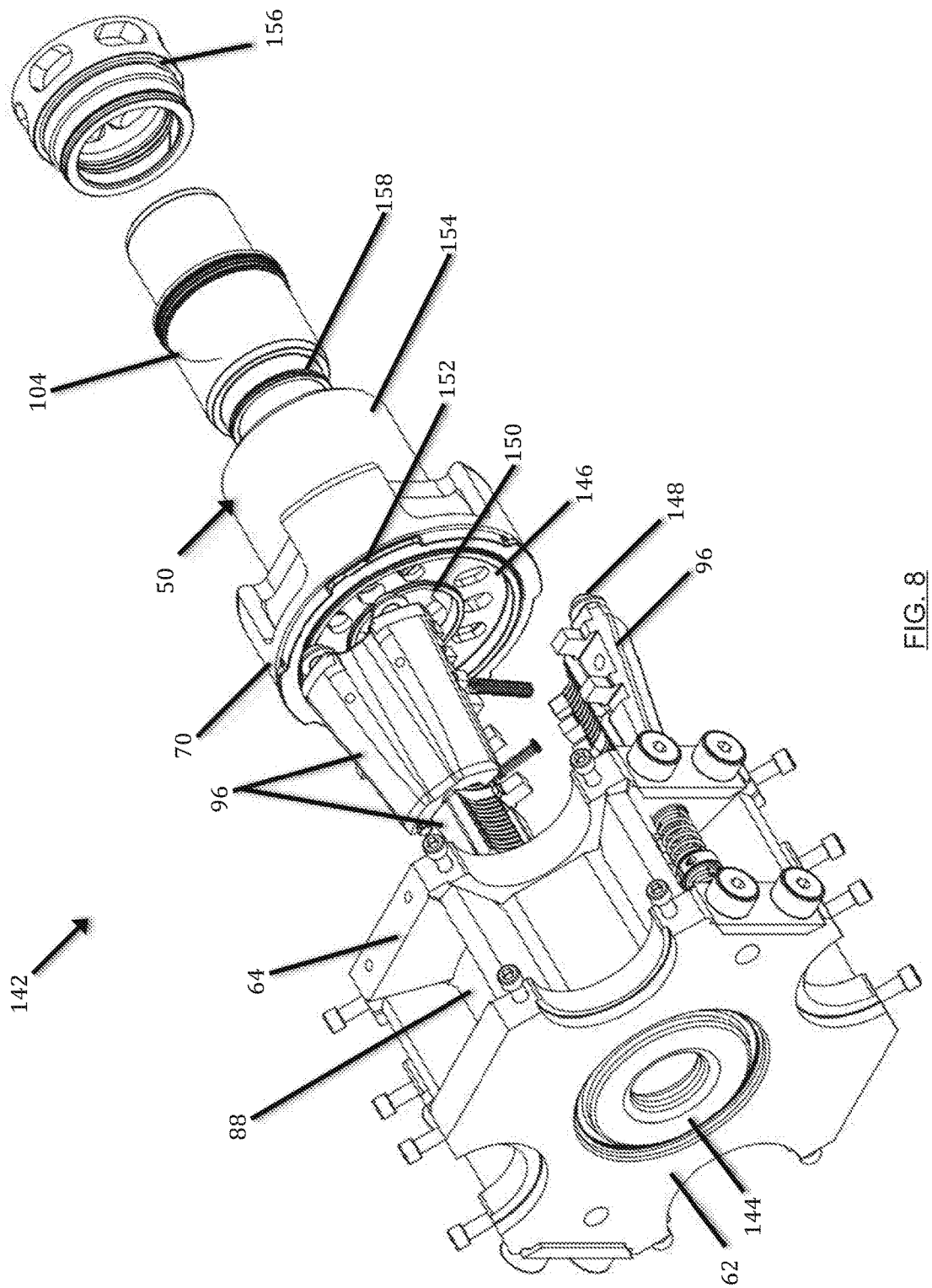
FIG. 8 is an exploded view of an embodiment of the present invention in which the rod string section passes through the actuator.

Turning now to FIG. 8, a grip assembly 142 very similar to the grip assembly 24 of FIGS. 2-6 is shown in exploded view. The grip assembly 142 differs from grip assembly 24 in that it does not require the pair of shafts 76 and the yoke 80.

The front flange 62, rear flange 64, and the bowl ring 88 support the slip bowl 92 (FIG. 9). The slips 96 are partially disposed within the slip bowl and moveable toward and away from the narrow end 144 of the slip bowl. Each of the plurality of slips 96 may be connected to the thrust member 146 using fasteners 148.

In the grip assembly 142 the thrust member 146 comprises a metal ring that is supported within bracket 70. Thrust member 146 is moveable within bracket 70 along axis 93 (FIG. 5). The thrust member 146 comprises a central opening 150 coaxial with axis 93 and configured to allow a rod string section to pass through. The thrust member 146 may comprise a plurality of ears 152 corresponding, to slots within the bracket 70. The slots and ears 152 prevent rotational movement of the thrust member 146 and the slips 96 relative the grip assembly 142.

The actuator 50 comprises a cylinder housing 154, piston 104, and cylinder cap 156. The cylinder housing 154 is affixed to the bracket 70 and may be threaded thereto or integrally formed. An O-ring 158 is disposed within the housing 154 and around the piston 104 to seal the housing at the end from which the piston extends. The piston 104 is hollow and disposed within the housing 154 for axial sliding movement along axis 93 (FIG. 6). The cylinder cap 156 is threaded onto the housing and seals the second end of the actuator 50.

Turning now to FIG. 9, the grip assembly 142 is shown in sectional view with a portion of a rod string section 160 positioned within the actuator 50 and the slips 96 in a gripping relationship with the rod string section. As shown in FIG. 9, the actuator has a hollow piston 104 through which the rod string section 160 to be gripped passes. However, the piston 104 does not itself engage the rod string section 160 to grip the rod string section. Rather, the piston 104 urges the slips 96 toward the narrow end of the slip bowl 92 to cause the jaws 58 supported on the slips 96 to grip the rod string section 160. In FIG. 9, the actuator has been powered to urge the piston in direction "A" toward the narrow end of the slip bowl. Urging the piston 104 in direction "A" pushes the slips 96 into a gripping relationship with the rod string section 160. With the slips in a gripping relationship with the rod string section 160 the positioning assembly 22 may be powered to urge the grip assembly 142 and the gripped rod string section 160 in the direction "A". The positioning assembly 22 carries the grip assembly 142 and powers reciprocating and straight-line movement of the grip assembly along the rails 20 (FIG. 2) in direction "A" with the slips in the gripping relationship.

Figure 10:
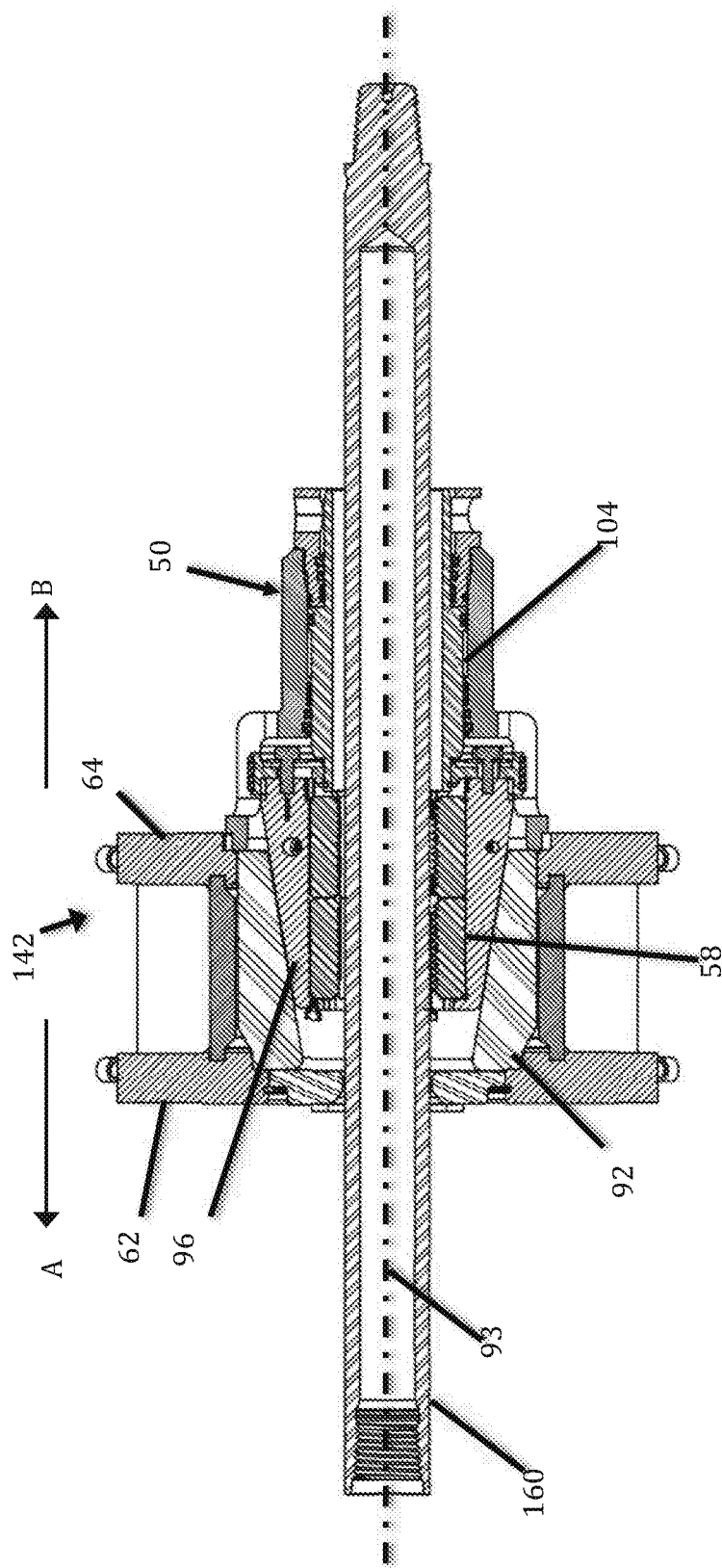
FIG. 10 is a sectional view of the gripping assembly of FIG. 8 showing the slips in a non-gripping relationship with the rod string section.

With reference now to FIG. 10, the grip assembly 142 is shown with the slips in an ungripped relationship with the rod string section 160. In FIG. 10, the actuator 50 has been powered to move the piston 104 in the second direction "B". Moving the piston 104 in direction B urges the slips 9 6 away from the narrow end of the slip bowl 92 and into the ungripped relationship with the rod string section. Thus, the slips 96 have been partially withdrawn from the slip bowl to pull the jaws 58 away from the rod string section 160. In the ungripped relationship there is a gap between the rod string section 160 and the jaws 58. In this relationship, the positioning assembly 22 may be powered to move the grip assembly 142 along axis 93 without pulling the rod string section 160 in the second direction, direction "B".

One skilled in the art will appreciate that during pull back operations the grip assembly 142 is urged in direction "B" by the positioning assembly 22 (FIG. 2) with the slips 96 in the gripping relationship shown in FIG. 9 to pull the rod string 12 and product pipe through the bore 14. Likewise, during pullback operations the positioning assembly 22 moves the grip assembly 142 in direction "A" with the slips in the ungripped relationship to move the grip assembly 142 to a location to grip the rod string section for the pull back stroke of the positioning assembly.

In operation, the thrust unit 10 is positioned at a desired location such as a launch pit and a rod string section 160 is placed within the actuator 50 and slip bowl 92 and started into the bore 14. Rod string sections are positioned within the actuator 50 and threaded to the rod string 12 using the spinner 30. After a new rod string section has been connected to the up-hole end of the rod string, the actuator 50 is operated to urge the slips in the first direction relative to the slip bowl 92 to place the slips in a gripping relationship with the rod string section 160. Once the rod string section has been gripped, the positioning assembly 22 is powered to urge the grip assembly and the gripped rod string section in the first direction, "A". The positioning assembly 22 uses cylinders 26 to urge the grip assembly in the first direction.

When the cylinder 26 reaches the end of its push stroke the actuator 50 is powered to urge the slips 96 in a second direction "B", opposite the first direction, away from the narrow end of the slip bowl 92 and into the ungripped position to release the rod string section 160. The positioning assembly 22 is powered to move the grip assembly, without the formerly gripped rod string section, in the second direction. The rod string may be repeatedly gripped and released with the grip assembly in coordination with operation of the positioning assembly 22 to push the rod string to the target location.

Upon reaching the target location a downhole tool and a new pipe may be connected to the distal end of the rod string 12. The downhole tool and new pipe are then pulled through the ground toward the thrust unit 10 by repeatedly gripping and releasing the rod string to pull the rod string until it is removed from the ground and the new pipe has been pulled into its desired location.

Various modifications can be made in the design and operation of the present invention without departing from the spirit thereof. Thus, while the principle preferred construction and modes of operation of the invention have been explained in what is now considered to represent its best embodiments, which have been illustrated and described, it should be understood that the invention may be practiced otherwise than as specifically illustrated and described.

The invention claimed is:

1. A method comprising:
    positioning a first portion of a rod string section within a slip bowl having an internal passage that tapers in a first direction from a larger first end to a smaller second end;
    thereafter, actuating a plurality of slips, each having an external surface matching the internal passage of the slip bowl, in the first direction to cause a gripping relationship between the plurality of slips and the rod string;
    while the slips are actuated to cause the gripping relationship, urging the slip bowl and the rod string in the first direction to urge a second portion of the rod string into the ground; and
    urging the slip bowl and the rod string in a second direction to urge the second portion of the rod string out of the ground, wherein the first direction and second direction are opposite.

2. The method of claim 1 wherein the slip bowl and the rod string are urged in the second direction with the plurality of slips not being actuated.

3. The method of claim 1 wherein the internal passage is symmetrical about an axis.

4. The method of claim 3 in which the actuator comprises a piston that is coaxial with the axis about which the slip bowl is symmetric.

5. The method of claim 1 in which the slip bowls are actuated with a piston.

6. The method of claim 5 in which the piston is hollow and coaxial with the slip bowl.

7. The method of claim 1 in which the rod string is urged into an existing pipe in the ground.

8. The method of claim 1 wherein the rod string is advanced to a ground exit point.

9. The method of claim 8 wherein the ground exit point is at a terminal end of an existing pipe.

10. The method of claim 1 further comprising attaching a pipe slitter to the rod string after urging the rod string into the ground and before urging the rod string out of the ground.

11. The method of claim 1 further comprising:
    after urging the slip bowl and the rod string in the first direction, actuating the plurality of slips in the second direction to release the gripping relationship;
    thereafter, moving the slip bowl and plurality of slips in the second direction without urging the rod string;
    actuating the plurality of slips in the first direction to cause the gripping relationship;
    urging the slip bowl and the rod string in the first direction to further urge the second portion of the rod string into the ground; and
    repeating the above steps a plurality of times before urging the slip bowl and the rod string in the second direction.

12. A method comprising:
    gripping a rod string section with a grip assembly comprising a slip bowl and a plurality of slips by actuating the plurality of slips in a first direction into the slip bowl, wherein the slip bowl defines an internal passage that tapers in the first direction from a larger first end to a smaller second end;
    advancing the grip assembly in the first direction while gripping the rod section to push a rod string in the first direction;
    releasing the grip of the rod section by actuating the plurality of slips in a second direction, wherein the second direction is opposite the first direction; and
    moving the grip assembly in the second direction without gripping the rod section.

13. The method of claim 12 comprising:
    gripping the rod string section by actuating the plurality of slips into the slip bowl; and
    moving the grip assembly in the first direction a second time to push the rod string in the first direction.

14. The method of claim 12 wherein the slips are actuated by extending a piston.

15. The method of claim 14 wherein the piston is coaxial with a longitudinal axis of symmetry of the slip bowl.

16. The method of claim 12 wherein the grip assembly advances and retracts only on a straight line.

17. The method of claim 12 comprising moving the slip grip assembly in the second direction while the rod string is gripped to push the rod string in the second direction.

18. The method of claim 17 wherein the rod string is pushed in the first direction and in the second direction by the grip assembly without altering the orientation of the slips and the slip bowl.

* * * * *

UNITED STATES PATENT AND TRADEMARK OFFICE
CERTIFICATE OF CORRECTION

PATENT NO. : 10,161,201 B2
APPLICATION NO. : 15/585295
DATED : December 25, 2018
INVENTOR(S) : Wentworth et al.

Page 1 of 1

It is certified that error appears in the above-identified patent and that said Letters Patent is hereby corrected as shown below:

On the Title Page

Item (57), under the Abstract, Line 12, please delete "is".

In the Specification

Column 2, Line 34, please delete "is".
Column 4, Line 25, please delete "tine" and substitute therefore "the".
Column 4, Line 29, please delete "tine" and substitute therefore "the".
Column 5, Line 2, please delete "rains" and substitute therefore "rams".
Column 5, Line 17, please delete "(FIG." and substitute therefore "(FIG. 2)".
Column 5, Line 24, please delete "bolls" and substitute therefore "bolts".
Column 6, Line 56, please insert --is-- after "92".
Column 6, Line 62, please delete "is".
Column 8, Line 37, please delete "9 6" and substitute therefore "96".

In the Claims

Column 10, Claim 17, Line 1, please delete "slip".

Signed and Sealed this
Fifth Day of February, 2019

Andrei Iancu
*Director of the United States Patent and Trademark Office*